United States Patent
Ingvast et al.

(10) Patent No.: US 8,814,460 B2
(45) Date of Patent: Aug. 26, 2014

(54) CABLE CONNECTOR

(71) Applicant: Bioservo Technologies AB, Kista (SE)

(72) Inventors: Johan Ingvast, Åkersberga (SE); Johan Bolin, Uppsala (SE)

(*) Notice: Subject to any disclaimer, the term of this patent is extended or adjusted under 35 U.S.C. 154(b) by 68 days.

(21) Appl. No.: 13/707,626

(22) Filed: Dec. 7, 2012

(65) Prior Publication Data

US 2013/0145584 A1    Jun. 13, 2013

Related U.S. Application Data

(60) Provisional application No. 61/567,683, filed on Dec. 7, 2011.

(51) Int. Cl.
*B25G 3/00*    (2006.01)

(52) U.S. Cl.
USPC .......................................... 403/301; 439/660

(58) Field of Classification Search
USPC ......... 403/300–302, 291, 311, 314, 339, 340, 403/364; 24/122.3, 136 R; 439/660
See application file for complete search history.

(56) References Cited

U.S. PATENT DOCUMENTS

| | | | | |
|---|---|---|---|---|
| 4,526,057 A | * | 7/1985 | Mochida et al. | 74/502.2 |
| 6,102,609 A | * | 8/2000 | Tsuge | 403/301 |
| 6,902,341 B1 | * | 6/2005 | Rauschert | 403/43 |
| 2006/0194468 A1 | * | 8/2006 | Griffin | 439/352 |

* cited by examiner

*Primary Examiner* — Gary Paumen
(74) *Attorney, Agent, or Firm* — Venable LLP; Eric J. Franklin

(57) ABSTRACT

A cable connector comprising a housing comprising a first and second housing parts adapted to be connected into a closed state and be separated into an open state. The first housing part holds a first core wire of the first cable and a first joining part attached to an end of the first core wire and adapted to move in a first and second direction along a first sliding path. The second housing part holding a second core wire or string of the second cable and a second joining part attached to an end of the second core wire or string and adapted to move in a first and second direction along a second sliding path. First and second engagement surfaces of first and second joining parts, abut and form a contact surface for transmitting force along the first and second sliding paths between the first and second joining parts.

14 Claims, 6 Drawing Sheets

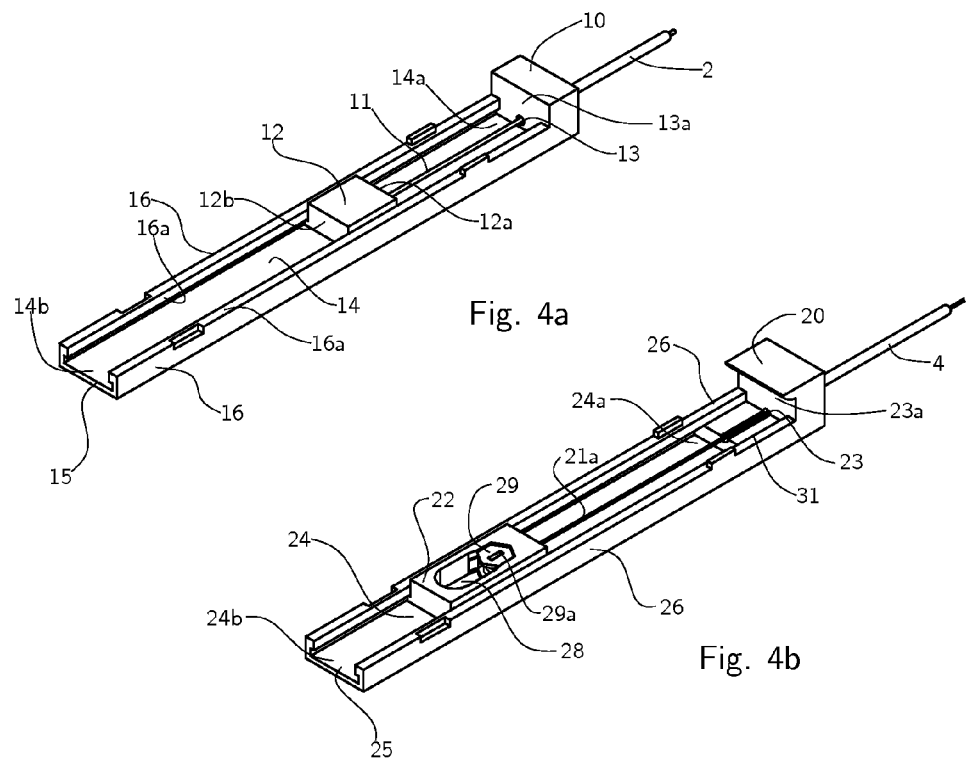
Fig. 4a
Fig. 4b
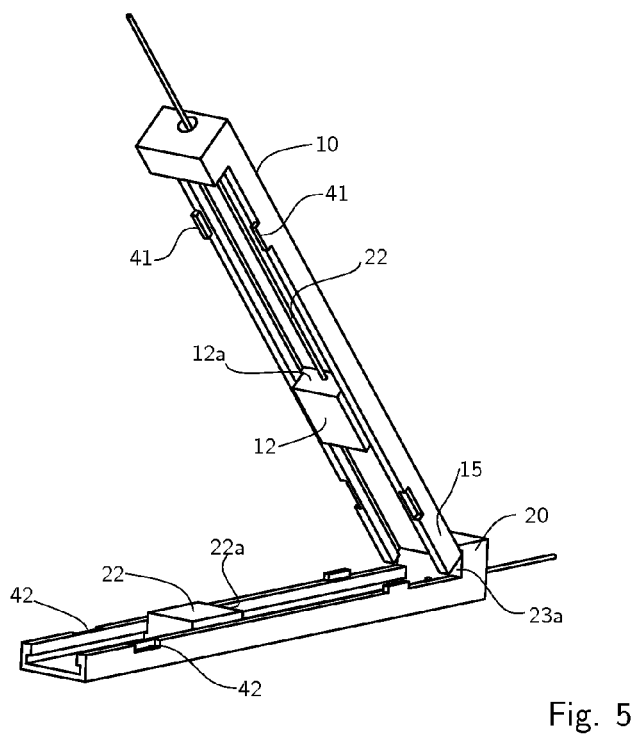
Fig. 5

CABLE CONNECTOR

CROSS-REFERENCE TO RELATED APPLICATIONS

This application claims the benefit of U.S. Provisional Application No. 61/567,683, filed on Dec. 7, 2011. The entire teachings of the above application are incorporated herein by reference.

TECHNICAL FIELD

The present invention relates to a cable connector for connecting and disconnecting two or more cables. More particularly, the invention relates to a cable connector comprising a housing in which at least two actuating cables are adapted to be connected to each other. The housing has a first and second housing part adapted to be connected into a closed state and separated into an open state.

BACKGROUND

Actuating cables may be used in many different applications. For example, in vehicles actuating cables are used for transmitting motion of vehicle transmissions or accelerators but also for remotely actuating latch mechanisms of a vehicle trunk and the like. Other examples of use may include wearable body enhancing devices such as artificial limbs, i.e. prosthesis or grip enhancing gloves. These kinds of devices may need to have the actuating unit away from where the actuation takes place.

In FR2805578A1 it is described a device preferably used in a car for connecting two movable cables to each other. The two cable ends are formed to engage with each other with a male coupling connecting a female coupling for transmitting both pulling and pushing forces. When closing the device the female and male part have to be in specific positions relative each other to fit into each other.

GB2458640 discloses a similar device which is also used in a vehicle. This device makes use of a connection unit for engaging two traction cords instead of a male-female coupling. One traction cord is fixedly attached to the connection unit. The other traction cord is received in a free space in the connection unit which also permits a limited movement of the traction cords. A drawback with both these devices is that they are not designed to be repeatedly opened and re-closed. Further, another drawback is that they are difficult, if at all possible, to open under load.

As may be realized there is a need for improvements in the field of cable connectors for transmission of forces.

SUMMARY

An object of the present invention is to overcome or at least improve at least one of the disadvantages with the prior art.

A further object may be to provide an improved cable connector that can be easily and readily opened and also re-closed.

At least one of the objects is achieved by a cable connector in accordance with claim 1.

By arranging the first and second engagement surfaces to abut each other when transmitting a linear force wherein the first and second joining parts respectively are adapted to transmit force in one of the first or second directions along the first and second sliding paths and wherein the first and second joining parts respectively are adapted to move unengaged in the other direction as a response to movement of the first or second joining part, a robust and yet effective cable connector for transmission of linear forces is provided. Further, the cable connector is capable of easily and quickly connecting and disconnecting. As the two joining parts only abut each other, a separation of the first and second housing part may easily be done even under load, i.e. in use.

A further advantage with this embodiment is that the cable connector may be arranged to transmit pulling forces only or pushing forces only. Accordingly, the inner core wires or string are capable of moving unengaged or freely in one direction without transmitting any forces. A cable connector arranged to transmit pulling forces only may have at least one of the cables provided with an inner string, which in turn means that the cable connector may be used to transmit linear forces in applications where it previously has been difficult to at all arrange it for connection of at least two cables.

According to a further embodiment of the invention, the first and second engagement surfaces are arranged to slide relative each other as the cable connector is moved from the closed state to the open state. It is an advantage that the engagement surfaces abut each other along a surface which means that if they are to be separated under load, they may slide along the surface relative each other until they are separated.

In still another embodiment of the invention, the cable connector further comprising a detector adapted to register the open state of the housing, such that the first joining part is adapted to be moved to a first joining part first end point or to a first joining part second end point of the first sliding path when the detector registers the open state. In this way it is assured that the first and second joining parts will always be in a position relative each other such that they are arranged to transmit a force between the joining parts. Accordingly, this feature makes it possible to always re-close the cable connector. It is further easy to handle the cable connector for those who are not used to operating the cable connection as it is automatically provided in a position ready to use.

In another embodiment of the invention, the cable connector further comprising electrical connector provided in the first housing part and in the second housing part adapted to form an electrical connection between the actuator and the actuated device when the housing is in the closed state. It is an advantage to be able to provide both transmission of electrical signals or power and mechanical forces in the same device.

DEFINITIONS

As used herein, the expression "actuating cable" relates to a cable adapted to transmit an actuating force. For example, the actuating force may be a pulling or pushing force transmitted via the actuating cable to a device that is to be actuated.

With the expression "core wire" as used herein, is meant the inner wire of a cable having one ore more concentric layers. For example, an actuating cable may comprise an inner core wire surrounded by an outer sleeve. Further, a core wire as used herein is adapted to receive and/or transmit a pulling force as well as a pushing force.

As used herein, the expression "core string" relates to the inner string of a cable having one ore more concentric layers. For example, an actuating cable may comprise an inner core string surrounded by an outer sleeve. Further, a core string as used herein is adapted to receive and/or transmit a pulling force only.

BRIEF DESCRIPTION OF THE DRAWINGS

The present invention will hereinafter be further explained by means of non-limiting examples with reference to the appended figures where;

FIG. 4a shows a perspective side view of part of the cable connector seen in FIGS. 1-3, FIG. 4b shows a perspective side view of another embodiment of part of the cable connector, FIG. 5 shows a perspective side view of the cable connector according to FIG. 2 in an open state.

DETAILED DESCRIPTION

Figure 1A:
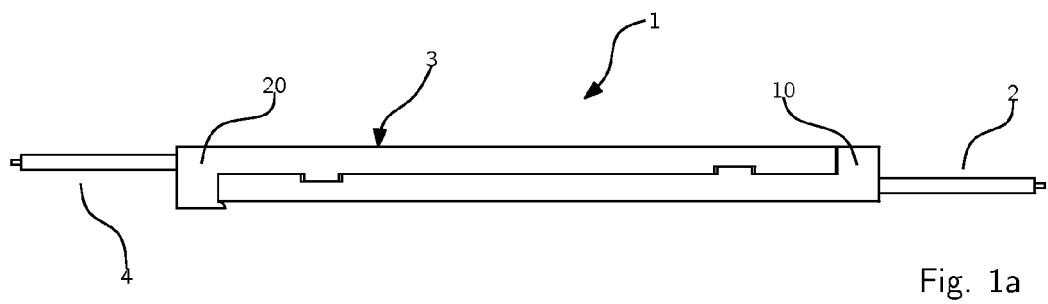
FIGS. 1a-1b show in a schematic manner a side view and a top view of a cable connector according to one embodiment.

The invention will be described using examples of embodiments. It should however be noted that the example embodiments are included in order to explain principles of the invention and not to limit the scope of the invention, defined by the appended claims. Throughout the following description similar reference numerals have been used to denote similar elements, parts, items or features, when applicable.

FIG. 1a shows a side view of an embodiment of the disclosed cable connector 1 for connecting and disconnecting two actuating cables 2, 4. The cable connector 1 comprises a housing 3, which has a first housing part 10 and a second housing part 20. The first cable 2 is adapted to be connected to an actuator (not shown) and the second cable 4 is adapted to be connected to an actuated device (not shown). The actuated device may for example be a part of the transmission system in a vehicle. The actuated device may further be an artificial limb or a grip enhancing glove. Such a grip enhancing glove is for example described in WO2008/027002A1. When disconnecting the cable connector the first and second housing parts are separated into an open state, which is more closely described in relation to FIG. 5.

Figure 1B:
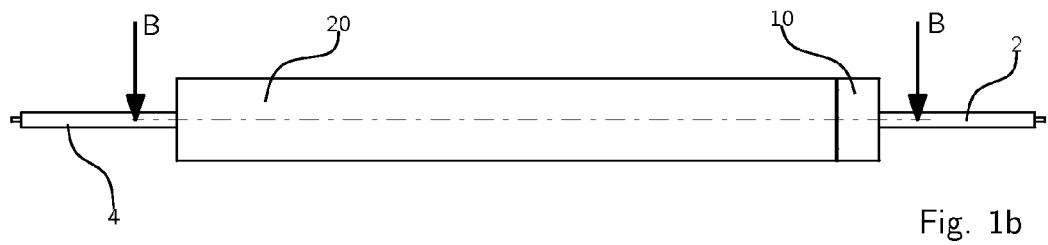

FIG. 1b is a top view of the cable connector shown in FIG. 1a showing the first housing part 10 with the first cable 2 and the second housing 20 with the second cable 4.

Figure 2:
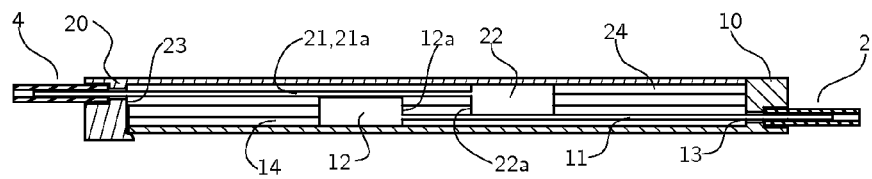
FIG. 2 shows a cross-sectional view along the line B-B of FIG. 1b of the cable connector according to an embodiment.

FIG. 2 shows a cross-sectional view of the cable connector according to an embodiment. The cables 2, 4 may comprise a core wire or string 11, 21, 21a surrounded by and an outer sleeve. A first core wire 11 of a first cable 2 is introduced into the first housing part 10. A second core wire or string 21, 21a of a second cable 4 is introduced into the second housing part 20. In an embodiment the first cable 2 holds a core wire inside a sleeve outside the housing and it is thus only the core wire 11 that enters the first housing part 10 through a first core wire inlet 13. The second housing part 20 has in the same way an inlet for the second core wire or string 21, 21a, which is a second core wire or string inlet 23. The first and second cables may be so called Bowden-cables, which generally comprise a sleeve and an inner core wire, core string or traction cord. The first and second housing parts 10, 20 receive a first core wire 11 and a second core wire or string 21, 21a respectively. At an end of the first core wire, a first joining part 12 having a first engagement surface 12a is arranged. At an end of the second core wire or string, a second joining part 22 having a second engagement surface 22a is arranged. When forces are applied to the cables, the first and second joining parts 12, 22 will move along a first and second sliding path 14, 24 respectively. The first core wire and the second core wire or string are adapted to act as a single core wire or string for transmitting force along the first and second sliding paths. The first sliding path 14 is arranged in the first housing part 10. The second sliding path 24 is arranged in the second housing part 20. In the first sliding path 14 the first joining part 12 may move along the first sliding path in a first and in a second direction respectively, i.e. away from the first core wire inlet 13 or towards the first core wire inlet. In the second sliding path 24 the second joining part 22 may move along the second sliding path in a second and in a first direction, i.e. away from the second core wire or core string inlet 23 or towards the second core wire or core string inlet. In the closed state, the first and second sliding paths form a main sliding path 14, 24 which is a sliding path for the first and second joining part 12, 22 to move along in the housing 3.

The embodiment shown in FIG. 2 is arranged for transmission of pulling forces only. This means that when a pulling force is applied on the first core wire 11 the first joining part 12 moves in a direction towards the first core wire inlet 13 of the first housing part 10. At one point the first engagement surface 12a will abut the second engagement surface 22a and the second core wire or string 21 will also move in the direction towards the first core wire inlet 13. As the two engagement surfaces 12a, 22a of the joining parts abut, the core wire will act as a single core wire or string and a linear force is transmitted. A contact surface is established between the first and second joining parts 12, 22 engaging the first and second joining parts as long as they abut each other.

Figure 3:
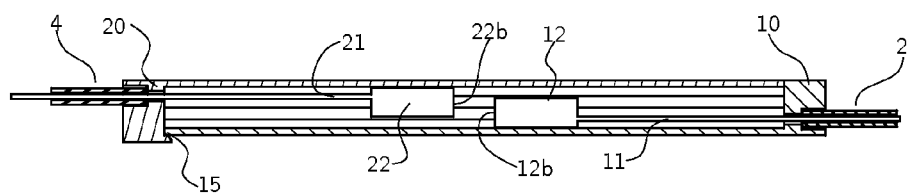
FIG. 3 shows a cross-sectional view along the line B-B of FIG. 1b of the cable connector according to a further embodiment.

FIG. 3 shows a cross-sectional view of the cable connector according to another embodiment. The first core wire 11 of a first cable 2 is introduced into the first housing part 10. At an end of the first core wire the wire comprises a first joining part 12 having a first engagement surface 12b. A second core wire 21 of a second cable 4 is introduced into the second housing part 20. At an end of the second core wire 21 the wire comprises a second joining part 22 having a second engagement surface 22b. In this embodiment the actuating device is arranged for pushing forces only. This means that when a pushing force is applied on the first core wire 11 the first joining part 12 moves in a direction towards a distal end 15 of the first housing part 10. At one point the first engagement surface 12b will abut the second engagement surface 22b and the second core wire 21 will also move in the direction towards the distal end 15 of the first housing part 10. As the two engagement surfaces 12b, 22b of the joining parts 12, 22 abut each other, the first and second core wires 11, 21 will act as a single core wire and a linear force is transmitted. It should be noted that in this embodiment when pushing forces are applied to the first and second core wires, the core wires used have a certain consistency or rigidity in order to be able to transmit pushing forces.

A detector (not shown) may also preferably be arranged in the cable connector as illustrated in the embodiments in FIGS. 2 and 3 to detect the open (or closed) state of the connection. Such a detector may be any type of sensor adapted to detect if the connector is opened.

FIG. 4a shows a perspective view of the first housing part 10 in the open state. The first housing part 10 is generally formed as a generally rectangular flat body having two parallel side edges 16, a first core wire inlet portion 13a and a first housing part distal end 15 for defining the first sliding path 14. Each side edge 16 is further provided with a flange 16a such that the first joining part 12 is kept in the first sliding path 14. The flange 16a prevents the first joining part from falling out of the first sliding path when the housing is in an open state. The cable 2 is introduced at the first core wire inlet 13 and a first joining part 12 is attached to the core wire end. The first joining part is here illustrated in its simplest outline taking the form of a rectangular piece of material. The joining part may be made out of a polymeric material, a metal, a composite or other suitable material. The joining part has an engagement surface 12a to be used for transmitting pulling forces and an engagement surface 12b to be used if the cable connector is arranged for transmitting pushing forces. It may be noted that the first and second joining parts may adopt many different outer forms or configuration and still provide the core function, namely an engagement surface each such that a contact surface for transmitting force may be achieved. The second engagement surface on the second joining part has to be modified in a corresponding way such that the first and second engagement surfaces when they meet form a single contact surface for transmission of linear forces along the first and second sliding path 14, 24. In relation to FIGS. 11a-b another embodiment of the first and second joining parts is described. The fact that the first and second joining parts 12, 22 are arranged to abut each other along a surface normal to the sliding path contributes to the feature of easy and robust opening, even when the joining parts are transmitting force. When opening the housing as the first and second engagement surfaces abut each other, they simply slide against each other until they are not any longer in contact and thus the housing is opened. This feature also contributes to the feature of simple re-closing of the cable connector as the first and second joining parts do not have to be fitted into each other.

The first joining part is slidable arranged in a first sliding path 14 in the first housing part. There are two end points 14a, 14b for the first joining part in the sliding path 14. The first end point 14a is adjacent to the first core wire inlet 13 and the second end point is adjacent to the first housing part distal end 15. In one embodiment, the first joining part is moved to one of the end points in the first housing part when a detector registers that the cable connector has been opened. In the case that the cable connector is arranged for transmitting pulling forces, the first joining part 12 is then moved to the first housing part distal end 15. By doing this it is ensured that the cable connector always can be reclosed in a both safe and simple manner. Because when the first joining part 12 is in the first housing part distal end 15 it will always be possible to engage with the second joining part 22 despite the position of the second joining part in the second sliding path of the second housing part. A control unit (not shown) may be arranged within or outside the cable connector to control the actuated device. The control is based on information given from the detector, i.e. sensors in the actuated device, the connector and/or the actuator. In an embodiment the control unit controls the first joining part such that the first joining part is moved to a first part start point 14a or to a first end point 14b of the first sliding path 14 when the detector registers the open state.

For the sake of completeness it is to be mentioned that the second housing part 20 is designed in a corresponding way and comprises the same parts but will not be described in more detail here. However, the relation between first and second housing parts will be described in FIG. 5.

FIG. 4b illustrates a further embodiment of a second housing part 20 arranged for transmitting pulling forces. The second cable 4 is provided with an inner string 21a that is connected to a second joining part 22. The second joining part 22 is slidable arranged in the second sliding path of the second housing part 20. There are two end positions 24a, 24b for the second joining part in the second sliding path 24. The first end position 24a is defined by a distance piece 31 of the first joining part 12 away from the second core wire inlet 23. The reason for that is that it has to be secured that the first and second housing parts 10, 20 always can be reclosed. The second end position 24b for the second joining part is adjacent to the second housing part distal end 25. Further, in this embodiment the second joining part 22 is designed to adjust the length of the inner core 21a. In the second joining part 22 an open space 28 is formed. In the open space 28 a coil 29 is arranged for attaching the core string 21a. By means of the coil it is possible to adjust the length of the core string 21a by winding up some of the core string 21a. In FIG. 4b the coil 29 is shown in a locked position. To be able to adjust the core string 21a, the coil 29 is moved out in the open space 28 where there is some space to allow the coil 29 to be turned and thus the length of the core string 21a may be adjusted. A slit 29a is arranged on the coil 29 to facilitate the winding procedure with for example a tool or a finger nail.

In FIG. 5 shows the cable connector arranged for transmitting pulling forces in an opened state. The first and second housing parts are provided with locking arrangements 41, 42 for facilitating the opening and closing of the housing. In the embodiment of FIG. 5 the locking arrangements are provided on each the side edges 16, 26 of the respective housing parts 10, 20. Lugs 41 are provided on the first housing part to fit with corresponding grooves 42 on the second housing part. The lugs 41 are slightly resilient and will form a snap-fit coupling together with the corresponding grooves 42. To open the housing the area nearby the grooves 42 has to be pressed simultaneously to let loose from the grooves. It should be noted that instead the first housing part 10 may be arranged with the grooves 42 and the second housing part 20 with the lugs 41. The first housing part distal end 15 is pivotally connected to the second core wire inlet portion 23a on the second housing part 20 via a hinge axis. The cable connector may be opened when no forces are applied from the actuator or when forces are applied from the actuator such that the engagement surfaces 12a, 22a abut each other. As the first and second joining parts are engaged under load the hinge axis will take up forces from the first and second cable acting on the first and second housing parts. Accordingly, the force required to open the cable connector under load is relatively low.

Figure 6:
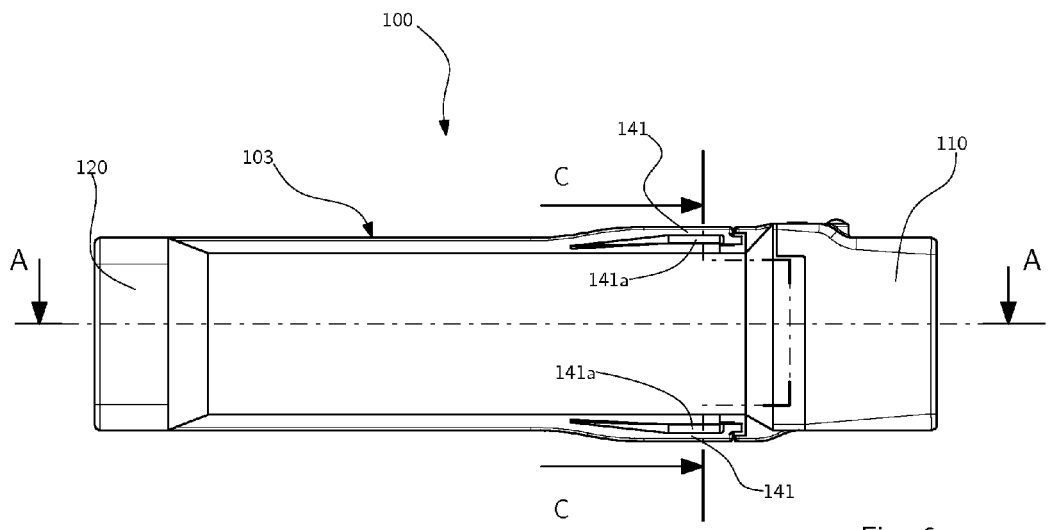
FIG. 6 shows a top view of a cable connector according to another embodiment of the invention.

FIG. 6 shows a further embodiment of the cable connector according to the invention. This embodiment is arranged for connecting more than two cables, which in this particular case is six cables. However, the number of cables to be connected in the cable connector may vary from one application to another, and accordingly also the number of sliding paths in the first and second housing parts respectively. In the embodiments shown the cables and core wires or strings have been removed for clarity. In FIG. 6 the cable connector 100 is in a closed state. The locking arrangement 141, 142 is visible at the sides for opening the housing 103.

Figure 7:
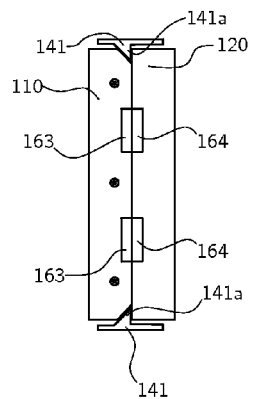
FIG. 7 shows a schematic cross-section along the line C-C of FIG. 6.

FIG. 7 is a cross-section along C-C in FIG. 6 to illustrate the opening and closing members 141, 142, 163, 164 arranged in the first and second housing parts 110, 120. The opening member comprises lugs 141 provided on the second housing part 120. Each lug has a wedge 141a on its inside, thus facing the housing 103 in a closed state. When the lugs are pressed upon during an opening action, the wedges are pressed in between the first and second housing part 110, 120 to separate them from each other by separating the closing member. The closing member comprises at least one permanent magnet 163 on the first housing part and a corresponding permanent magnetic material or magnetic on the second housing part. The closing member acts to keep the housing in the closed state during operation. It should be noted that the permanent magnet may instead be arranged on the second housing part and the corresponding permanent magnetic material or magnetic on the first housing part.

Figure 8:
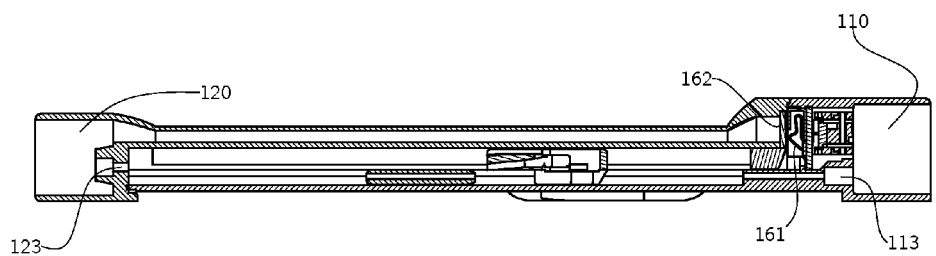
FIG. 8 shows a cross-section along the line A-A of FIG. 6.

FIG. 8 show cross-sectional views along the line A-A of FIG. 6. The first and second housing parts 110, 120 comprises the features for transmitting pulling or pushing forces as described in connection with FIGS. 1-5 and further also an electrical connector 161, 162.

Figure 9A:
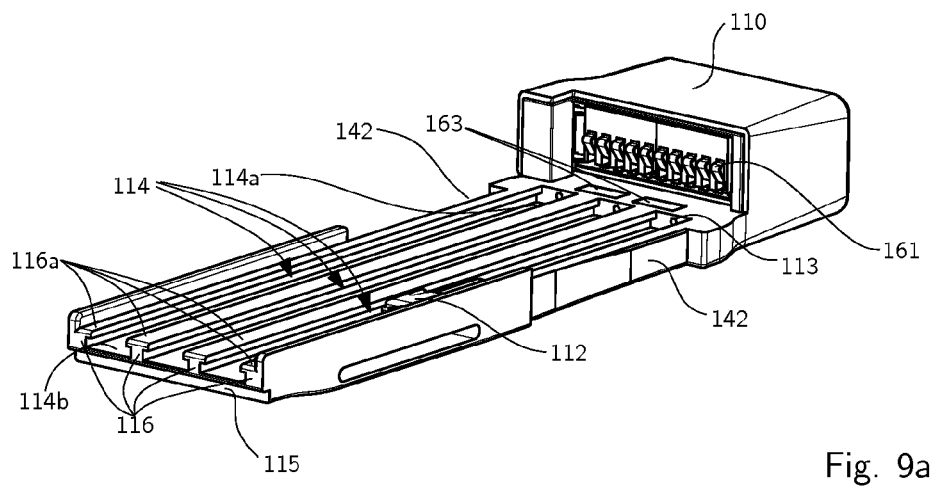
FIG. 9a shows a perspective view from above of one of the parts of the cable connector of FIG. 6.
Figure 9B:
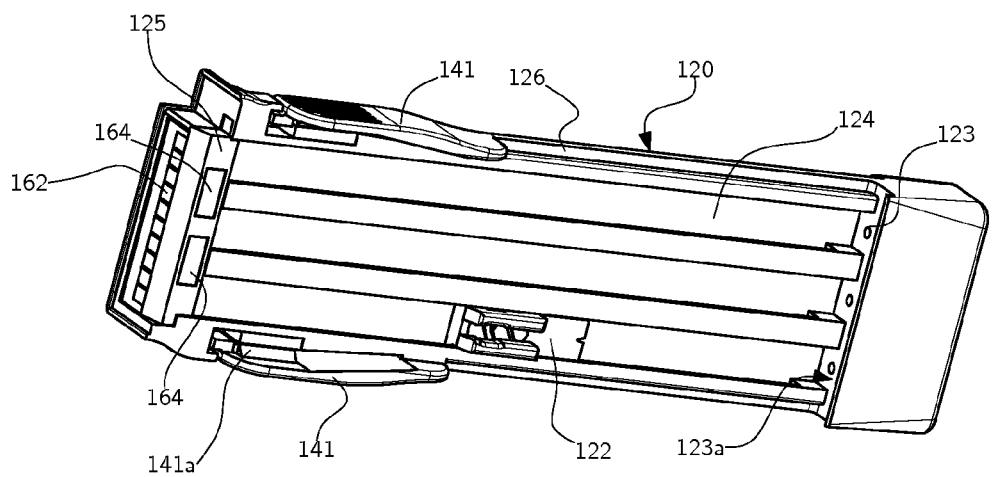
FIG. 9b shows a perspective view from above of the other part of the cable connector of FIG. 6.

FIGS. 9a-b show the first and second housing parts respectively in an open state completely separated from each other. The electric connection comprises springy elements 161 connecting to contact surfaces 162. The electrical connection may work as detector whereby a broken circuit indicates disconnection or open state of the housing 103. When the detector (not shown) registers that the housing 103 has been opened a control unit controls the actuator to move the first joining parts 112 to one of the end positions 114b. A detector (not shown) for registering the open state of the housing 103 may be realized in different ways. In one embodiment a Hall-sensor is arranged as detector in the first housing part 110. The Hall-sensor works as a switch to detect if the housing is opened. In another embodiment a tactile switch is used as detector in the electric connection 163 in the first housing part 110 to detect if the housing is open or closed.

Further in FIGS. 9a-b it is illustrated the opening and closing members of the housing 103. As a complement to the opening member 141, 142 there is provided at least one first permanent magnet 163 in the first core wire inlet portion 113a. This first permanent magnet interacts in the closed state with another second permanent magnet or a piece of material with magnetic properties 164 in the second housing part distal end 125. This magnetic arrangement 162, 163 enhances the closed state of the coupling and sees to that the first and second portion stays in a tight closed state.

Figure 10:
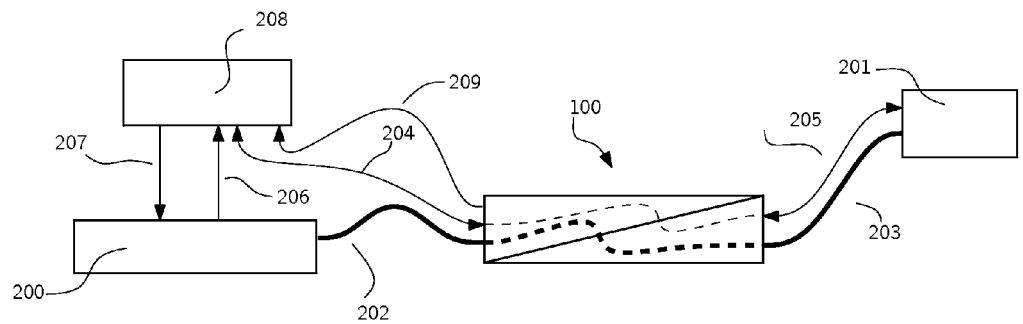
FIG. 10 illustrates in a schematic way the cable connector in use.

FIG. 10 is a schematic representation of a cable connector 1, 100 in use. The cable connector is in one end connected to an actuator 200, and in the other end the cable connector is connected to a device 201 that is to be actuated. Such an actuated device may for example be a grip enhancing glove. The cable connector is connected to the actuator via an actuating cable 202 for transmission of a mechanical force and via an electrical connection 204 to the control unit 208 that communicates 206, 207 with the actuator 200. The cable connector is connected to the actuated device 201 via an actuating cable 203 for transmission of mechanical force and via an electrical connection 205. A detector (not shown) is also preferably arranged in the cable connector to detect 209 the open (or closed) state of the connector. The opening of the connector 100 is detected by the control unit which controls the first joining part to a selected end point by commands to the actuator 207 so that the connector will be ready to become closed. The control just mentioned is based on information given from position detector, i.e. not shown sensors in the connector 100 and/or the actuator 200. The signals are transferred in electrical cables 204, 205 from the actuated device thru the connection 100 to the control unit and will be disconnected when the connector is open. Signals and/or power from the detector for detecting if the connection is open (or closed) may be connected with separate electrical cables 209 to the control unit 208.

Figure 11A:
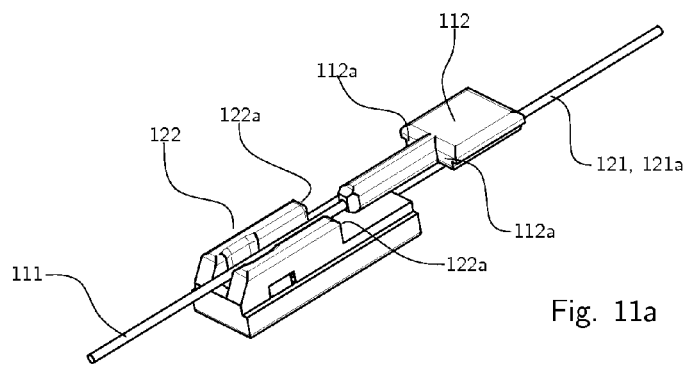
FIGS. 11a-b show an embodiment of a first and second joining part adapted to be used in the cable connector of the embodiment according to FIGS. 6-9, and FIGS. 12a-b illustrate in an embodiment of a first and a second joining part how they are adapted to transmit force via abutting engagement surfaces.
Figure 11B:
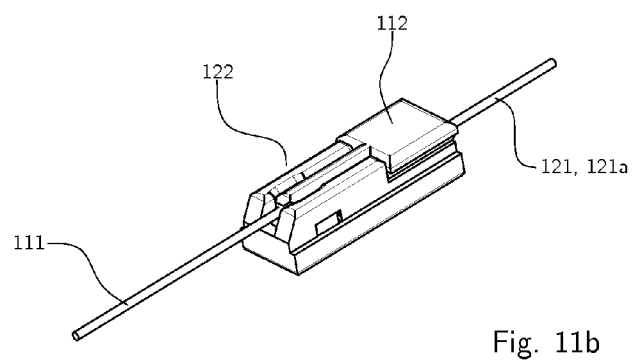

FIGS. 11a-b shows a further embodiment of the first and second joining parts 112, 122 adapted to be used with a cable connector of the type illustrated in FIGS. 6-9. The first and second housing parts are removed for clarity. The first and second joining parts are adapted to transmit pulling forces. The first joining part 112 is connected to the first core wire 111. The first joining part has a bottom side, a top side and two longitudinal sides. The bottom side is adapted to face the first sliding path 114, the top side is adapted to face the second housing part 120 in the closed state and the longitudinal sides are provided with flanges such that the first joining part is slidable arranged in the first sliding path in the first housing part. The flanges on the first joining part being formed such that they slide against the flanges 116a on the side edges 116 of the first housing part. The first joining part also has a first engagement surface facing the first core wire inlet. The second joining part 122 is connected to the second core wire or string 121, 121a. The second joining part has a bottom side, a top side and two longitudinal sides. The bottom side is adapted to face the second sliding path, the top side is adapted to face the first housing part in the closed state and the longitudinal sides are provided with flanges along its sides to be slidable arranged in the second sliding path of the second housing part. In this embodiment the second engagement surfaces 122a is separated in two halves so that the first core wire can pass in between. With this design the first core wire 111 can be nearly coaxial with the second core wire 121 or core string 121a. FIG. 11a shows the joining parts 112, 122 in the state when they are unengaged and thus free to move respectively away from each other. The second joining part also has a second engagement surface 122a facing the second core wire or string inlet 123. In FIG. 11b the first and second engagement surfaces abut each other and the first and second joining parts may transmit pulling forces along the first and second sliding paths.

Figure 12A:
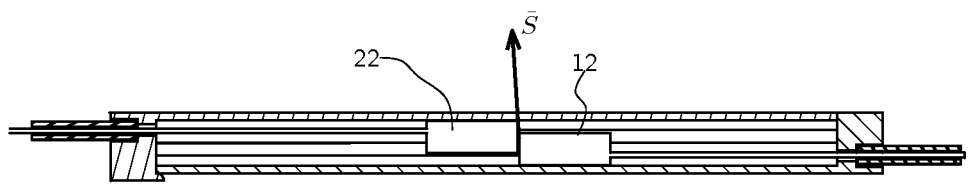
Figure 12B:
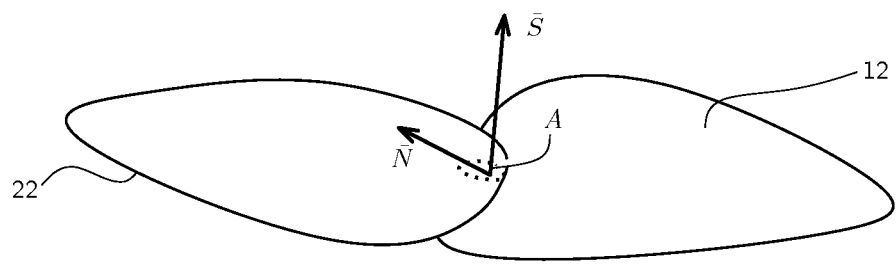

FIG. 12a-b illustrates the demands that have to be put on the engagement surfaces that abut the first and second joining parts. When the joining parts transmit force it takes energy to move a point fixed in the first joining part away from a fixed point in the second joining part. This means that if the joining parts have to move away from each other in the opening process, the opening is resisted in proportion to the force that the cable connector transmits. Therefore, to ensure the possibility of opening the connector at all situations the surfaces that abut each other has to be designed such that the joining parts do not have to move away from each other in the opening process. To exemplify when it is important that the surfaces have to be designed in this way is a situation when both joining parts for some reason have gotten stuck while abutting each other. They do not necessarily have to transmit very high forces, but since they cannot move apart they will make the opening impossible if the joining parts are wrongly designed. The following will give a mathematical demand that must be met for the first and second joining parts. When the joining parts abut each other they have a surface A in common. A is not necessarily contiguous. A has previously in figures been denoted 12a-b, 22a-b. When the connector is opened the second housing part moves in the direction $\bar{S}=\bar{S}(t,\bar{x})$ with respect to the first housing part. The second joining part is moved together with the second housing part because of constraints in the design. To be able to open the cable connection, a small distance in direction $\bar{S}$ all normals $\bar{N}$ to the surface A pointing out of the first joining part has to fulfill:

$$\overline{N} \cdot \overline{S} > 0$$

where <·> represents the inner product of two vectors in Euclidian vector space. As the connection is opened the contacting surface A changes and so may the opening direction $\overline{S}$. The above condition has to hold during the whole opening process until the contacting surface A vanishes. It should be noted that the vectors mentioned above do not necessary lie in the same plane. The arrangement of the surfaces such that they are possible to open we call that they are arranged to slide relative each other.

Further modifications of the foregoing embodiments within the scope of the protection sought may be realized by a person skilled in the art. For example, the outer shape and/or size of parts making up the cable connector may differ from what has been described in the exemplified embodiments to fit in different applications. Therefore, it is to be understood that the foregoing is illustrative of different embodiments disclosed and that modifications to the disclosed embodiments; combinations of features of disclosed embodiments as well as other embodiments are intended to be included within the scope of the appended claims.

The invention claimed is:

1. Cable connector for connecting and disconnecting at least a first cable and at least a second cable, comprising
    a housing in which said at least first and second cables are adapted to be connected to each other, said housing comprising
    a first housing part and a second housing part adapted to be connected into a closed state and to be separated into an open state,
    said first housing part holding a first core wire of said first cable and a first joining part, said first joining part being attached to an end of said first core wire and is adapted to move in a first and a second direction along a first sliding path,
    said second housing part holding a second core wire or string of said second cable and a second joining part, said second joining part being attached to an end of said second core wire or string and is adapted to move in a first and a second direction along a second sliding path, wherein a first engagement surface of said first joining part is adapted to abut against a second engagement surface of said second joining part forming a contact surface A for transmitting force between said first and said second joining parts wherein said first and second joining parts respectively are adapted to transmit force in one of said first or second direction along said first and second sliding paths and wherein said first and second joining parts respectively are adapted to move unengaged in the other direction as a response to movement of said first or second joining part.

2. Cable connector according to claim 1, wherein said first and second engagement surfaces are arranged to slide relative each other along said contact surface A while said cable connector is separated from said closed state to said open state.

3. Cable connector according to claim 1, wherein said first engagement surface faces towards a first core wire inlet of said first housing part and said second engagement surface faces towards a second core wire or string inlet of said second housing part whereby only pulling forces are transmitted in said first and second cable as a response to movement of said first or second joining parts.

4. Cable connector according to claim 1, wherein said first engagement surface faces towards a second core wire or string inlet of said second housing part and said second engagement surface faces towards a first core wire inlet of said first housing part whereby only pushing forces are transmitted in said first and second cable as a response to movement of said first or second joining parts.

5. Cable connector according to claim 1, wherein said cable connector further comprises
    a detector adapted to register said open state of said housing, whereby said first joining part is adapted to be moved to a first joining part first end point or to a first joining part second end point of said first sliding path when said detector registers said open state.

6. Cable connector according to claim 1, wherein said first cable is connected to an actuator and said second cable is connected to an actuated device.

7. Cable connector according to claim 1, wherein said first cable is connected to an actuator and said second cable is connected to an actuated device and wherein said cable connector further comprises
    an electrical connector provided in said first housing part and in said second housing part adapted to form an electrical connection between said actuator and said actuated device when said housing is in the closed state.

8. Cable connector according to claim 7, wherein said electrical connector comprises at least one springy element provided on one of said first or second housing parts and at least one connection surface provided on the other said first or second housing parts adapted to interact with said springy element.

9. Cable connector according to claim 7, wherein said cable connector further comprises
    a detector adapted to register said open state of said housing, whereby said first joining part is adapted to be moved to a first joining part first end point or to a first joining part second end point of said first sliding path when said detector registers said open state, and
    wherein said electrical connector further acts as said detector to detect if said housing is open or closed.

10. Cable connector according to claim 5, wherein said detector comprises a Hall-sensor or a tactile sensor working as a switch to detect if said housing is open or closed.

11. Cable connector according to claim 1, wherein said first housing part is pivotally connected to said second housing part via a hinge axis such that said second housing part can pivot around a first housing distal end.

12. Cable connector according to claim 1, wherein said first housing part and said second housing part are provided with at least one magnet adapted to keep said first and second housing part together in said closed state.

13. Cable connector according to claim 1, wherein said cable connector further comprises an opening member adapted to allow separation of the first and second housing parts.

14. Cable connector according to claim 13, wherein said opening member comprises at least one resilient lug provided on said first and/or second housing part having at least one wedge portion adapted to be pressed in between said first and second housing parts in an opening procedure.

* * * * *